US012338658B2

(12) United States Patent
Behrmann et al.

(10) Patent No.: US 12,338,658 B2
(45) Date of Patent: Jun. 24, 2025

(54) COUPLING ELEMENT, LOCKING SYSTEM AND FURNITURE

(71) Applicant: Paul Hettich GmbH & Co. KG, Kirchlengern (DE)

(72) Inventors: Gunter Behrmann, Kirchlengern (DE); Volker Pohlmann, Herford (DE)

(73) Assignee: Paul Hettich GmbH & Co. KG, Kirchlengern (DE)

( * ) Notice: Subject to any disclaimer, the term of this patent is extended or adjusted under 35 U.S.C. 154(b) by 16 days.

(21) Appl. No.: 18/283,852

(22) PCT Filed: Mar. 9, 2022

(86) PCT No.: PCT/EP2022/056034
§ 371 (c)(1),
(2) Date: Sep. 25, 2023

(87) PCT Pub. No.: WO2022/207260
PCT Pub. Date: Oct. 6, 2022

(65) Prior Publication Data

US 2024/0167301 A1 May 23, 2024

(30) Foreign Application Priority Data

Mar. 31, 2021 (DE) ..................... 10 2021 108 249.8

(51) Int. Cl.
*E05B 65/464* (2017.01)

(52) U.S. Cl.
CPC .................................. *E05B 65/464* (2013.01)

(58) Field of Classification Search
CPC .... E05B 65/462; E05B 65/463; E05B 65/464; E05B 65/465; A47B 88/50; A47B 2097/008
See application file for complete search history.

(56) References Cited

U.S. PATENT DOCUMENTS

| | | | | |
|---|---|---|---|---|
| 5,040,858 A * | 8/1991 | Kruse | .................. | E05B 65/463 312/221 |
| 2005/0040659 A1* | 2/2005 | Baker | .................. | E05B 65/463 292/338 |

(Continued)

FOREIGN PATENT DOCUMENTS

| | | | | |
|---|---|---|---|---|
| DE | 102010038247 A1 * | 5/2011 | ............. | A47B 88/47 |
| DE | 102010000326 A1 * | 8/2011 | ........... | A47B 88/463 |

(Continued)

OTHER PUBLICATIONS

International Search Report in PCT/EP2022/056034, mailed Jul. 5, 2022.

(Continued)

*Primary Examiner* — Andrew Roersma
(74) *Attorney, Agent, or Firm* — Collard & Roe, P.C.

(57) ABSTRACT

A coupling element for coupling a locking bar of a piece of furniture has a plurality of pull-out furniture parts to an activator coupled directly or indirectly to one of the pull-out furniture parts has a housing which can be placed against the locking bar, a driver which is mounted displaceably in the housing and is operatively connected to the locking bar for locking an extension movement of the other furniture part or parts, wherein the housing has a guide track in which a pin of the driver is guided, wherein the housing has at least one spring element serving to fix the housing relative to the locking bar. Furthermore, a locking system and a piece of furniture are described.

15 Claims, 16 Drawing Sheets

(56) References Cited

U.S. PATENT DOCUMENTS

Figure 1:
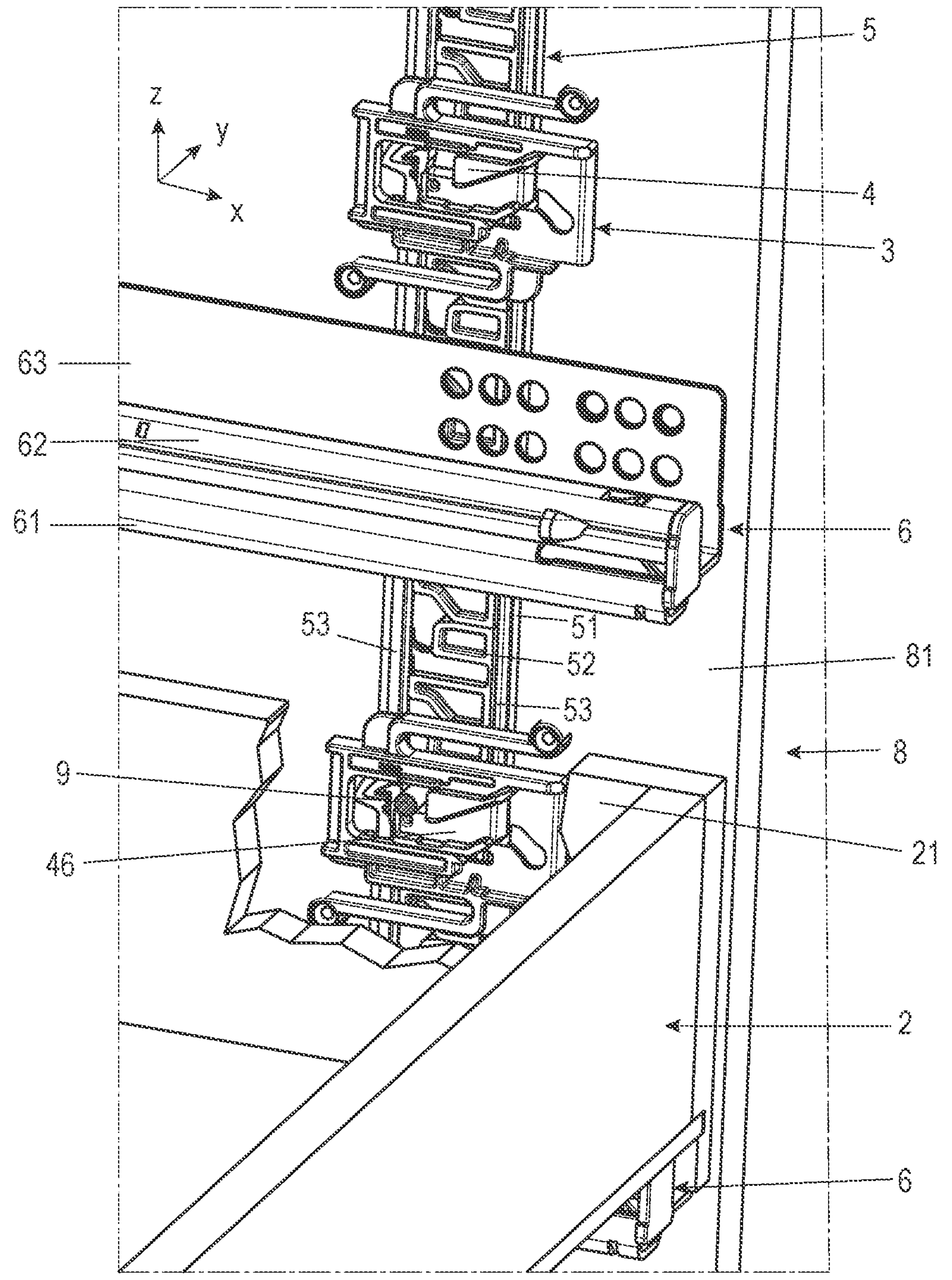

| | | | | |
|---|---|---|---|---|
| 2008/0284294 | A1* | 11/2008 | Leidner | E05B 65/464 312/221 |
| 2009/0278427 | A1 | 11/2009 | Ludwig et al. | |
| 2018/0066454 | A1* | 3/2018 | Lu | A47B 67/04 |

FOREIGN PATENT DOCUMENTS

| | | | | | |
|---|---|---|---|---|---|
| DE | 102011000493 | A1 | * | 8/2012 | A47B 88/467 |
| DE | 102012109751 | A1 | * | 4/2014 | A47B 67/04 |
| EP | 2055876 | A1 | * | 5/2009 | E05B 65/463 |
| EP | 2239402 | A2 | * | 10/2010 | E05B 65/463 |
| EP | 2630320 | B1 | * | 12/2014 | A47B 88/43 |
| EP | 2 576 945 | B1 | | 11/2015 | |
| EP | 2 210 525 | B1 | | 5/2018 | |

OTHER PUBLICATIONS

German Search Report dated Dec. 8, 2021 in German Application No. 10 2021 108 249.8, with English translation.

* cited by examiner

COUPLING ELEMENT, LOCKING SYSTEM AND FURNITURE

CROSS REFERENCE TO RELATED APPLICATIONS

This application is the National Stage of PCT/EP2022/056034 filed on Mar. 9, 2022, which claims priority under 35 U.S.C. § 119 of German Application No. 10 2021 108 249.8 filed on Mar. 31, 2021, the disclosure of which is incorporated by reference. The international application under PCT article 21(2) was not published in English.

The present invention relates to a coupling element for coupling a locking bar of a furniture having a plurality of pull-out furniture parts to an activator of one of the pull-out furniture parts according to the preamble of claim 1. The invention further relates to a locking system and a furniture having a plurality of pull-out furniture parts.

Such coupling elements are used in particular in locking systems for pull-out furniture parts of a piece of furniture with several furniture parts arranged one above the other.

Such a locking system is known, for example, from EP 2 210 525 B1. With such locking systems, it is possible, in the case of a piece of furniture with several drawers arranged one above the other, to prevent one or more other drawers from being pulled out at the same time, for example after one of the drawers has been pulled out.

The closing systems can be equipped with further functional elements, such as a self-retracting device, an ejector or damping elements, which simplify the operation of the respective pull-out furniture part.

A complex aspect of this prior art locking system is the assembly of the locking system, especially when coupling the furniture part to the coupling element.

It is the object of the present invention to provide a coupling element with which a simple and safe assembly of the individual pull-out furniture part into such a locking system is made possible.

A further object of the invention is to provide a corresponding locking system which enables coupling of the pull-out furniture parts in a simple manner.

Finally, it is a object of the invention to further develop a piece of furniture with several pull-out furniture parts in such a way that the coupling of the individual furniture parts to the locking bar is simplified.

The objects set are solved by a coupling element with the features of claim 1, by a locking system with the features of claim 9, and by a piece of furniture with the features of claim 12.

The coupling element according to the invention for coupling a locking bar of a piece of furniture having a plurality of pull-out furniture parts to an activator coupled directly or indirectly to one of the pull-out furniture parts has a housing which can abut against the locking bar and a driver which is displaceably mounted in the housing and is operatively connected to the locking bar for locking an extension movement of the other furniture part or parts.

The housing has a guide track in which a pin of the driver is guided.

The housing further comprises at least one spring element serving to fix the housing relative to the locking bar.

By fixing the housing of the coupling element via a spring element, it is possible in a simple manner, by simply pushing in the pull-out furniture part with the activator arranged therein in the direction of insertion, to push this against the driver of the coupling element in such a way that the coupling element itself, by fixing the latter via a spring element, can give way resiliently to the activator attached to the pull-out furniture part, thus enabling simple and safe coupling.

Advantageous embodiments of the invention are the subject of the subclaims.

According to an advantageous embodiment, the at least one spring element is designed as a spring arm formed on the housing.

Such a spring element, designed as a spring arm, can be easily molded onto the housing.

According to a further advantageous embodiment, the at least one spring element designed as a spring arm is angled, with a first leg extending from the housing edge and a second leg extending from this at an angle, preferably perpendicularly.

This enables, for example, the spring elements to be formed on the top and bottom of the housing in the installed state, from which the first leg preferably projects perpendicularly to enable the free end of the second leg to be bent in the direction of the edge of the housing, the second leg allowing the coupling element to give way during the assembly process.

This means that the coupling element can give way vertically in or on the locking bar.

The first leg is preferably shorter than the second leg and thus ensures sufficient stability.

According to a further embodiment, a fastening area for receiving a fastening element is formed in the region of a free end of the second leg.

The housing of the coupling element can be fixed, for example, to a wall of a furniture body by means of a fastening area designed, for example, as an eye. It is conceivable, for example, that it can be screwed, fixed with the aid of stop pins or dowels. Alternatively, the fastening area can also be designed as an adhesive surface and connected to the body by adhesive bonding.

In a preferred embodiment, one spring element protrudes from each of opposite outer edges of the housing.

This enables stable attachment of the housing while allowing the coupling element housing to give way.

According to a preferred embodiment, the fastening areas of the spring elements are positioned diagonally opposite each other relative to the outer edges of the housing.

According to an alternative embodiment, two spring elements protrude from exactly one of the outer edges of the housing.

The arrangement of two spring elements on exactly one of the outer edges also enables a deflecting movement of the housing of the coupling element, which facilitates assembly.

In this embodiment, the spring elements are preferably each formed with a straight leg, at the end of which remote from the housing a fastening area is formed for receiving a fastening element or for bonding.

In a preferred embodiment, the fastening areas of the spring elements are coupled together by a web, which further increases the stability of the coupling element.

The locking system according to the invention for a pull-out furniture part of a piece of furniture having a plurality of pull-out furniture parts has a self-retracting device with a housing and a retracting element attached thereto, as well as a coupling element for coupling a locking bar to the pull-out furniture part.

The coupling element is designed as described above, whereby the driver of the coupling element is coupled to the retracting element of the self-retracting device.

In a preferred embodiment of the closure system according to the invention, the housing of the self-retracting device is coupled to the housing of the coupling element.

In another preferred embodiment, the housing of the self-retracting device is formed integrally with the housing of the coupling element.

The furniture according to the invention with several pull-out furniture parts has a body with at least two walls arranged parallel to each other, on which guides are arranged for guiding several pull-out furniture parts arranged one above the other.

On at least one of the walls of the body is fixed a locking bar for locking a pullout movement of the furniture parts.

The furniture further comprises coupling elements for coupling the locking bar to the respective one of the pull-out furniture parts.

At least one of the coupling elements is designed as described above.

The coupling element is preferably arranged vertically displaceable in or on the locking bar by the at least one spring element.

In a preferred embodiment of the furniture according to the invention, the housing of the coupling element is attached to the wall of the body of the furniture.

In a preferred embodiment, each of the pull-out furniture parts is associated with a self-retracting device and/or locking device, wherein the self-retracting device comprises a housing and a retracting element attached thereto, which is coupled to the driver of the coupling element.

In the following, preferred embodiments of the invention are explained in more detail with reference to the accompanying drawings.

Figure 2:
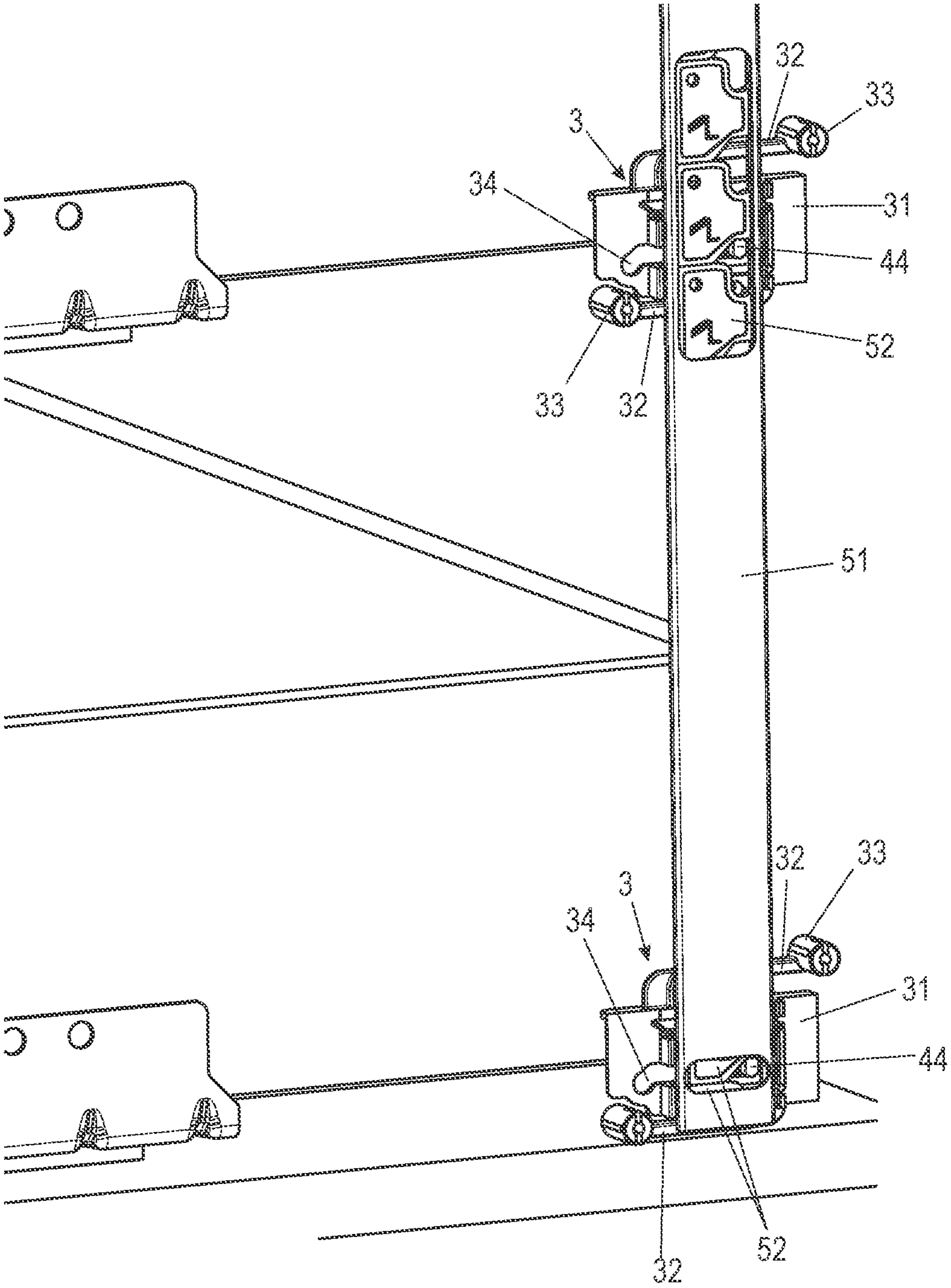
Figure 3:
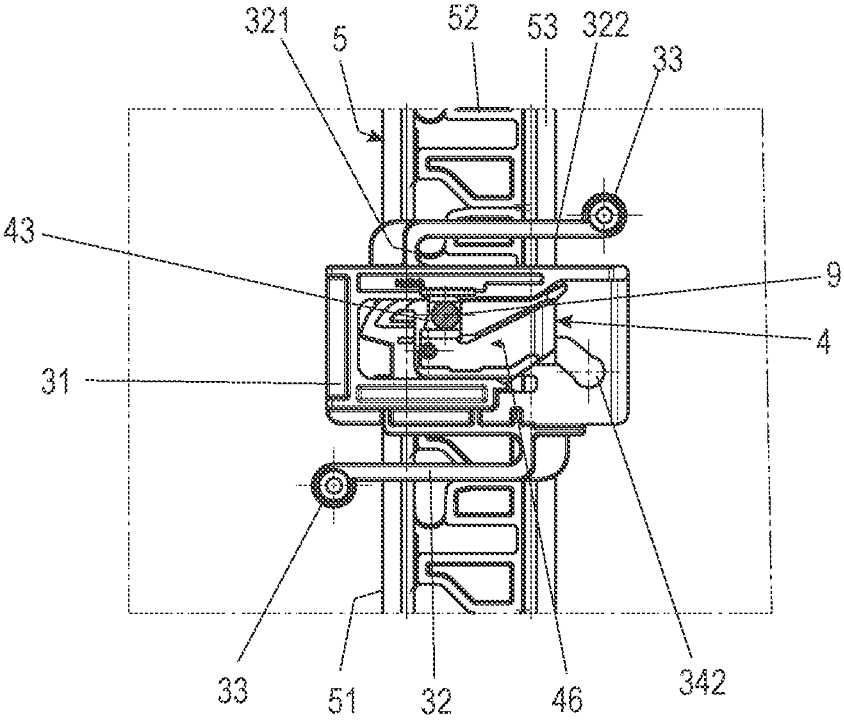
Figure 4:
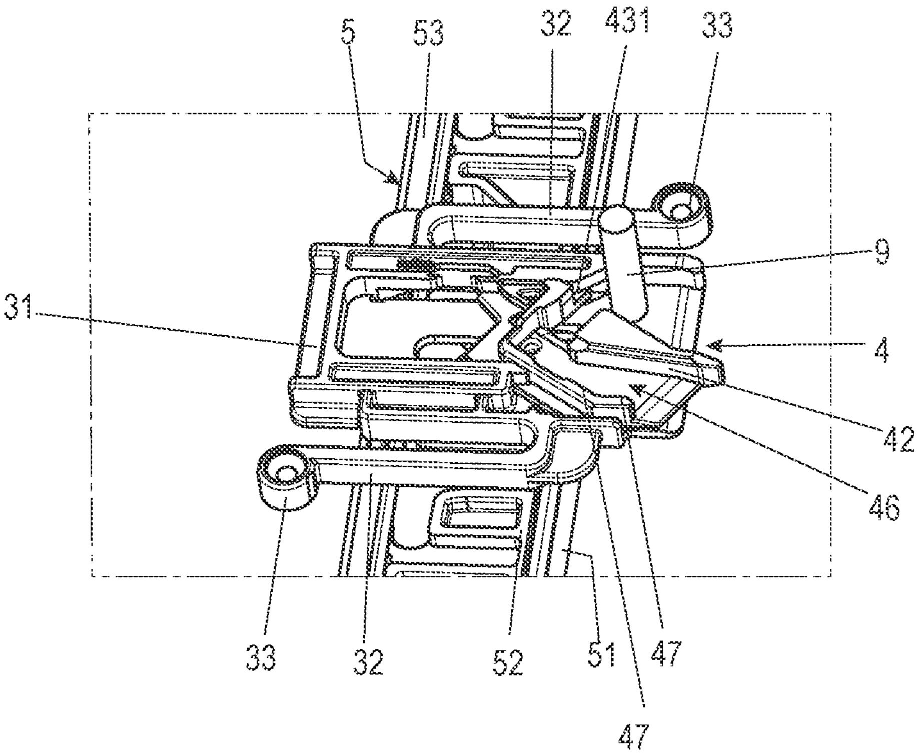
Figure 5:
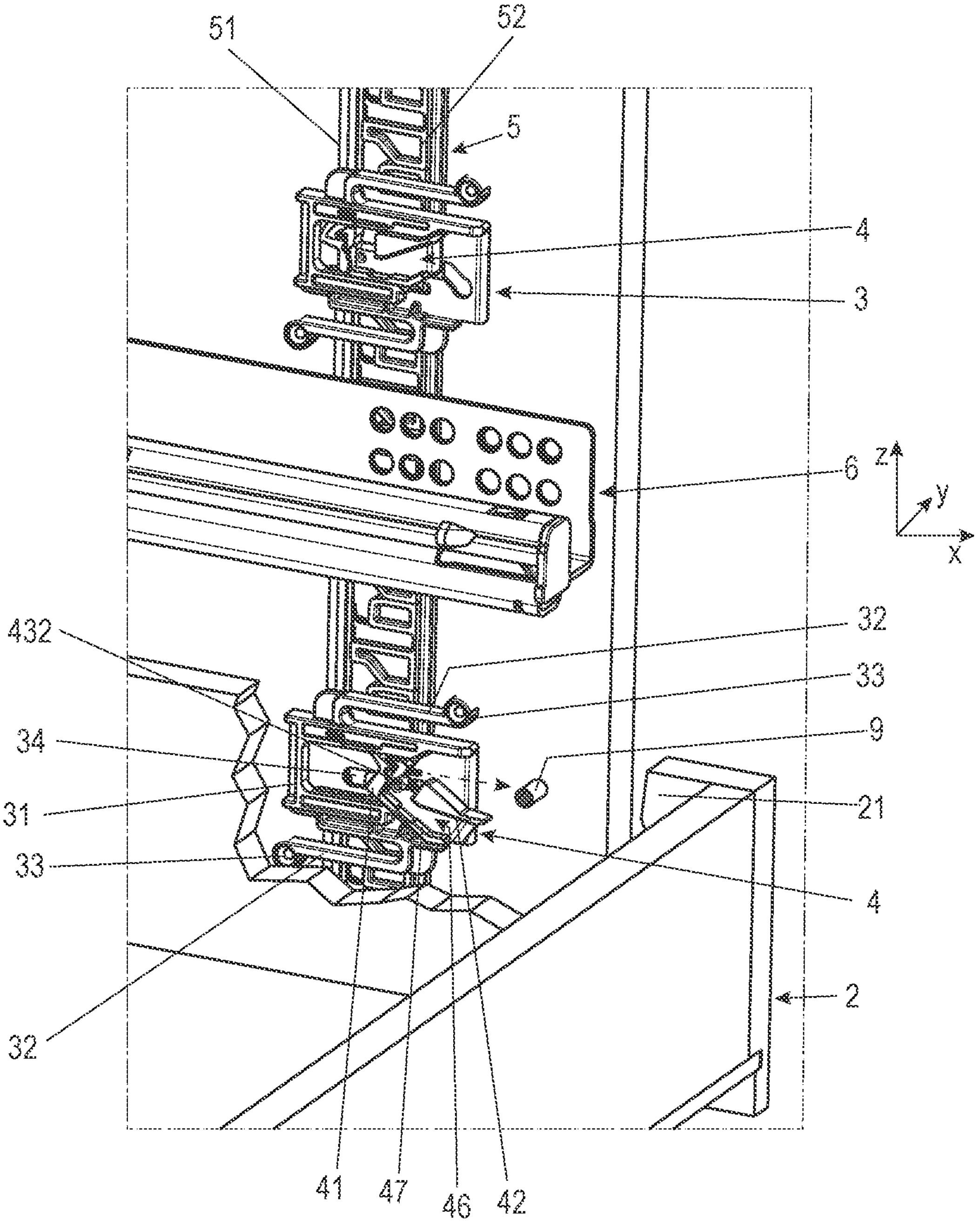
Figure 6A:
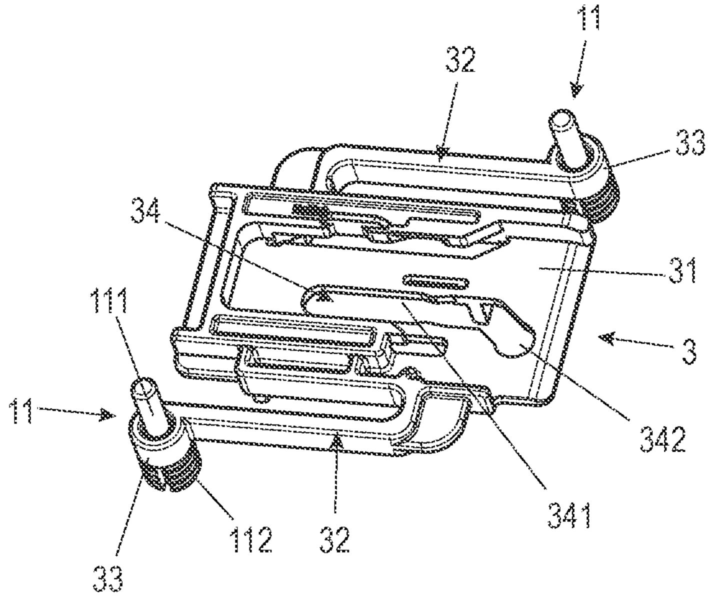
Figure 6B:
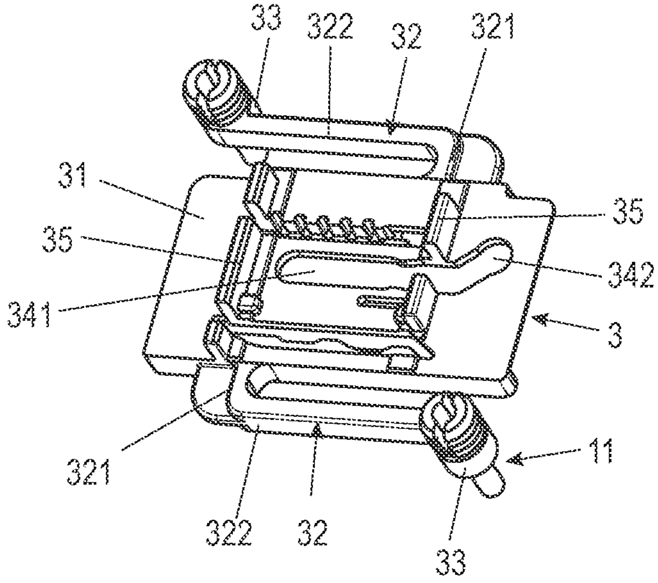
Figure 7A:
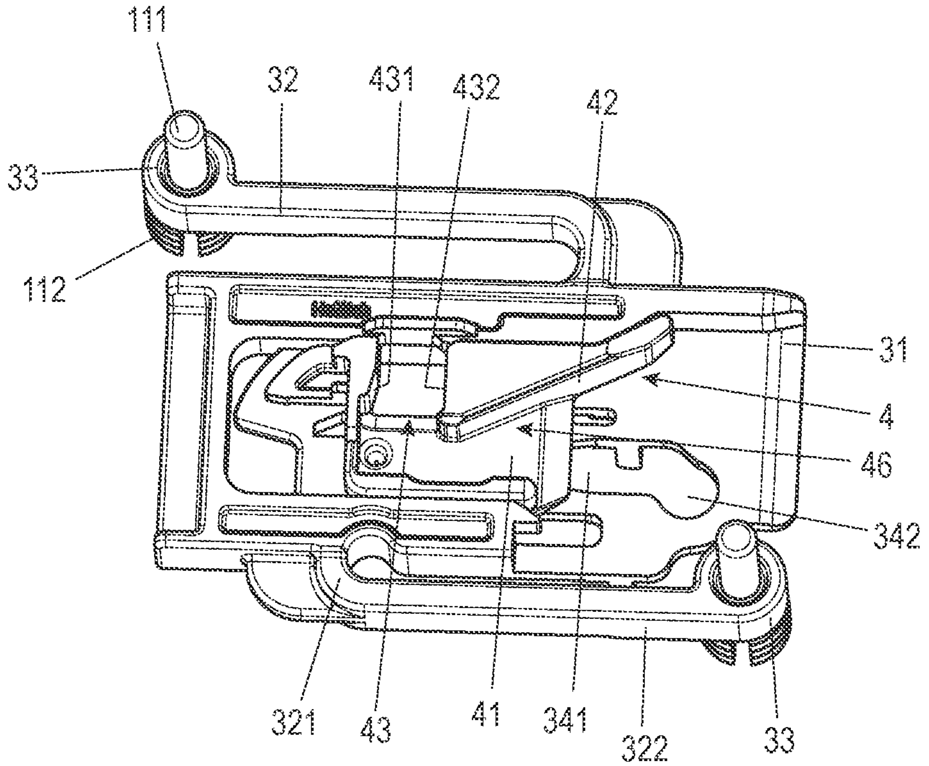
Figure 7B:
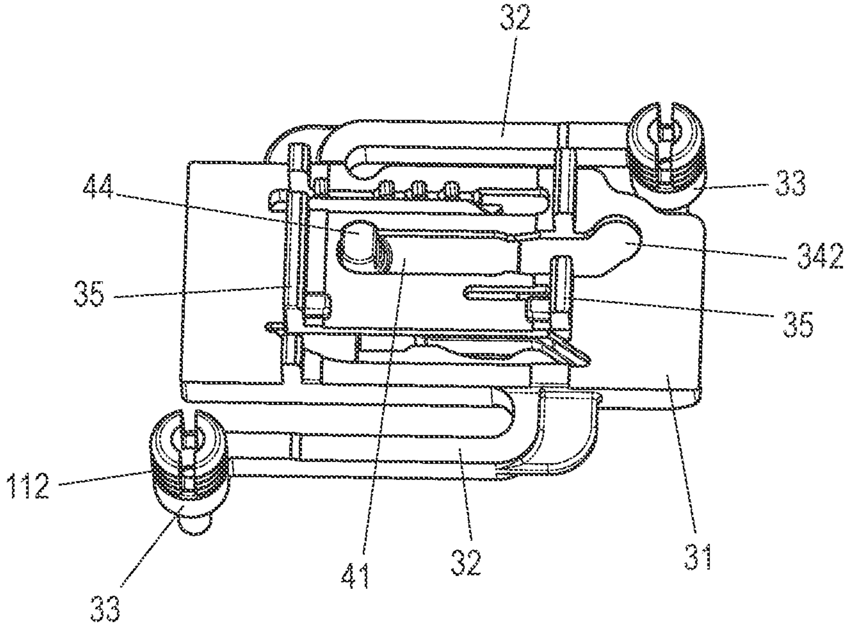
Figure 8A:
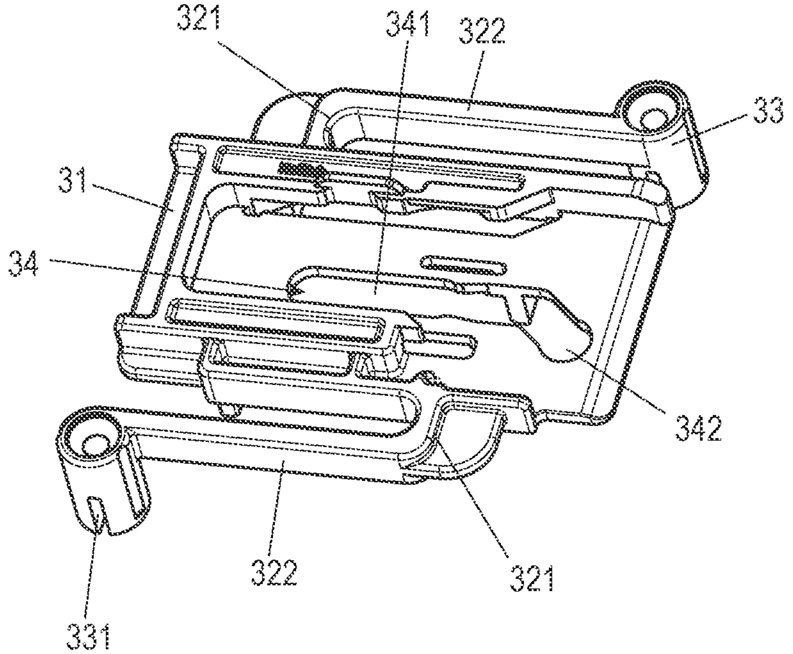
Figure 8B:
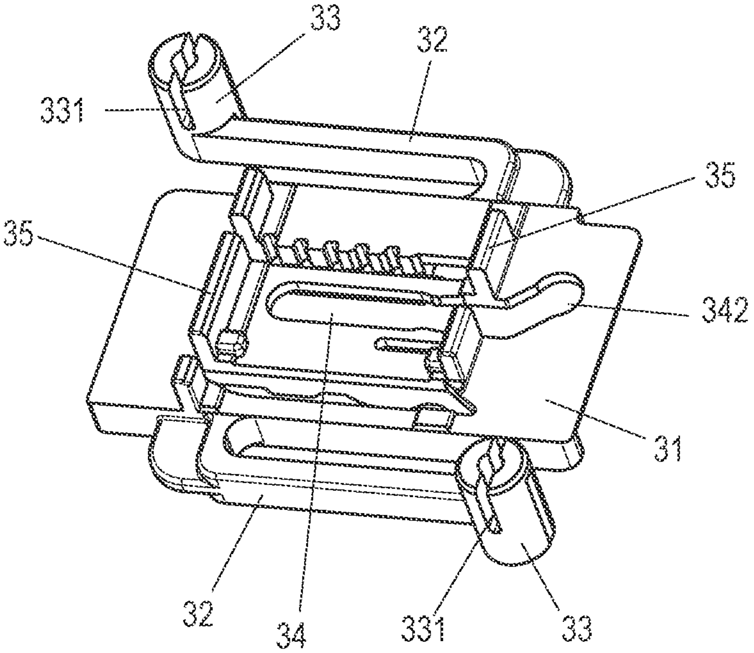
Figure 9A:
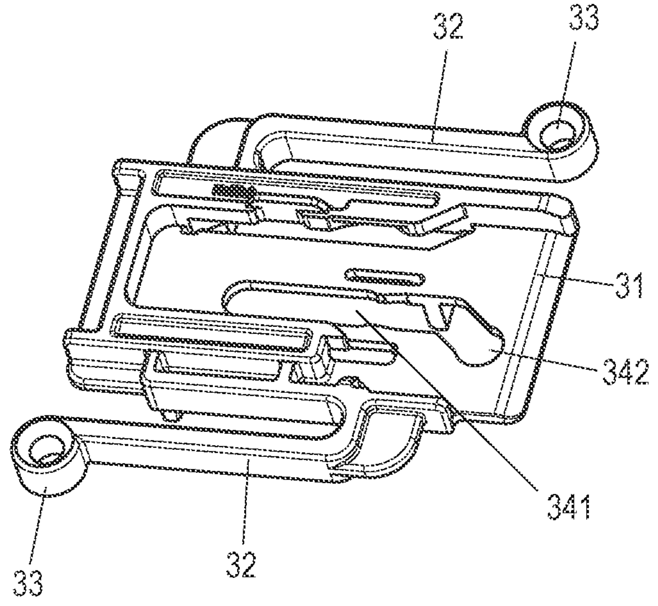
Figure 9B:
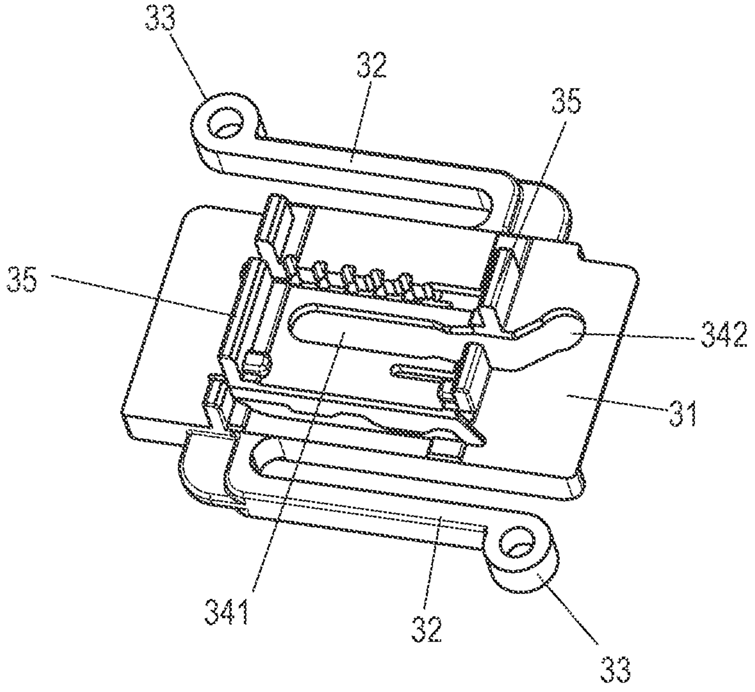
Figure 10:
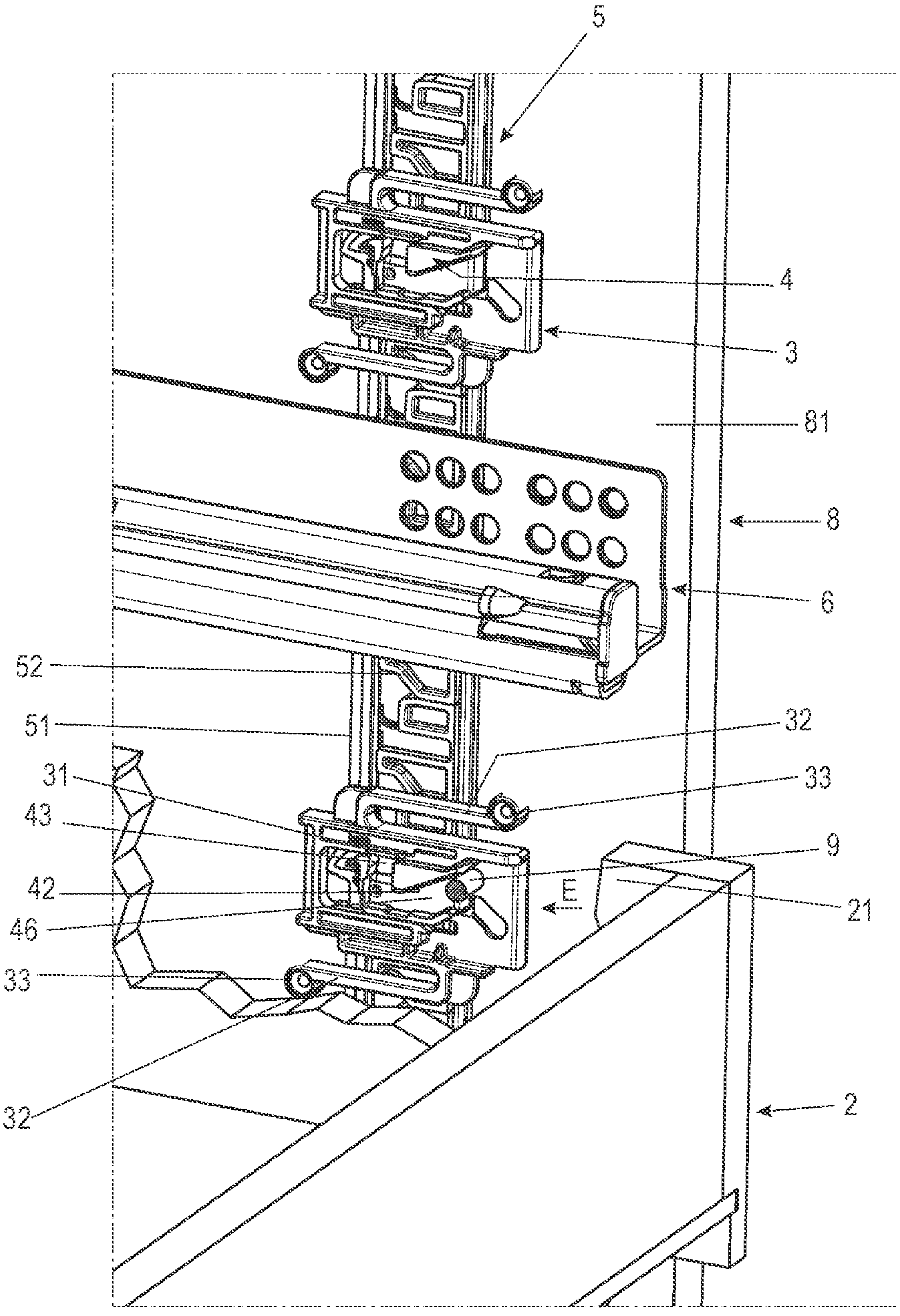
Figure 11:
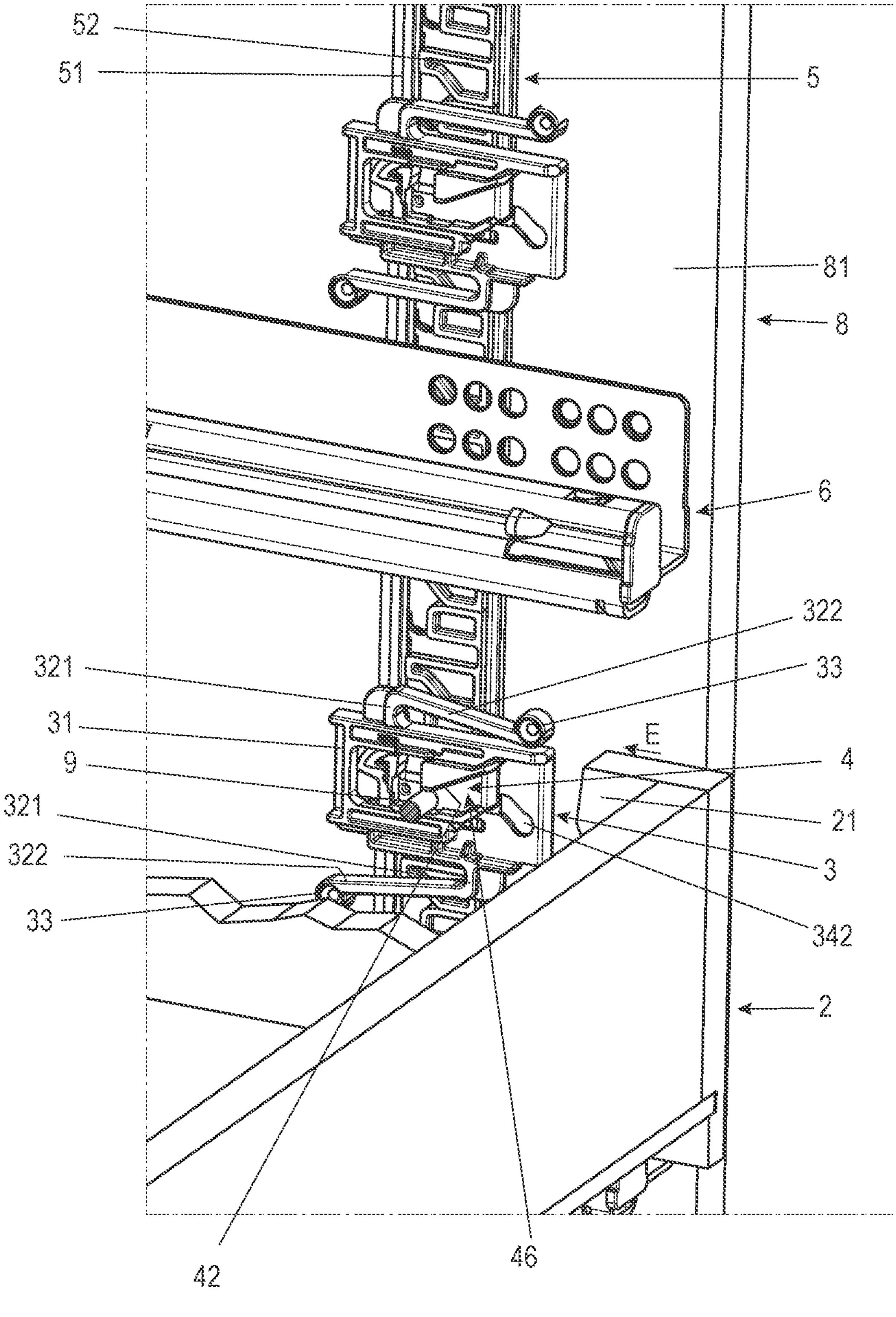
Figure 12:
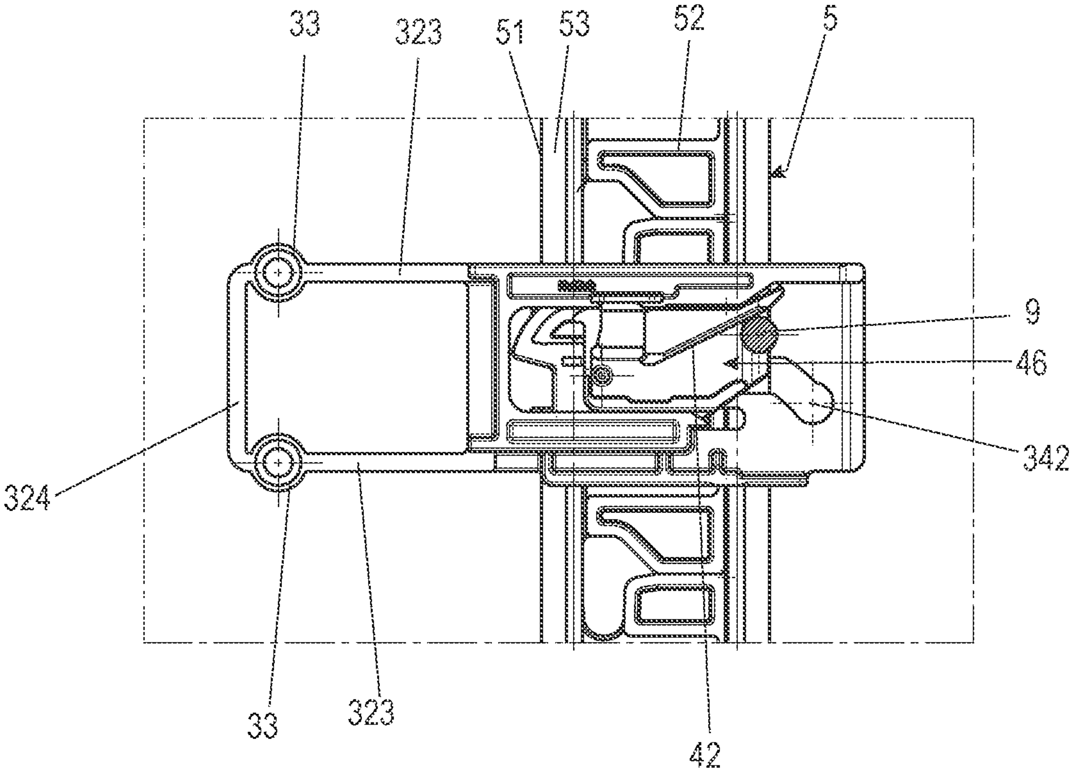
Figure 13:
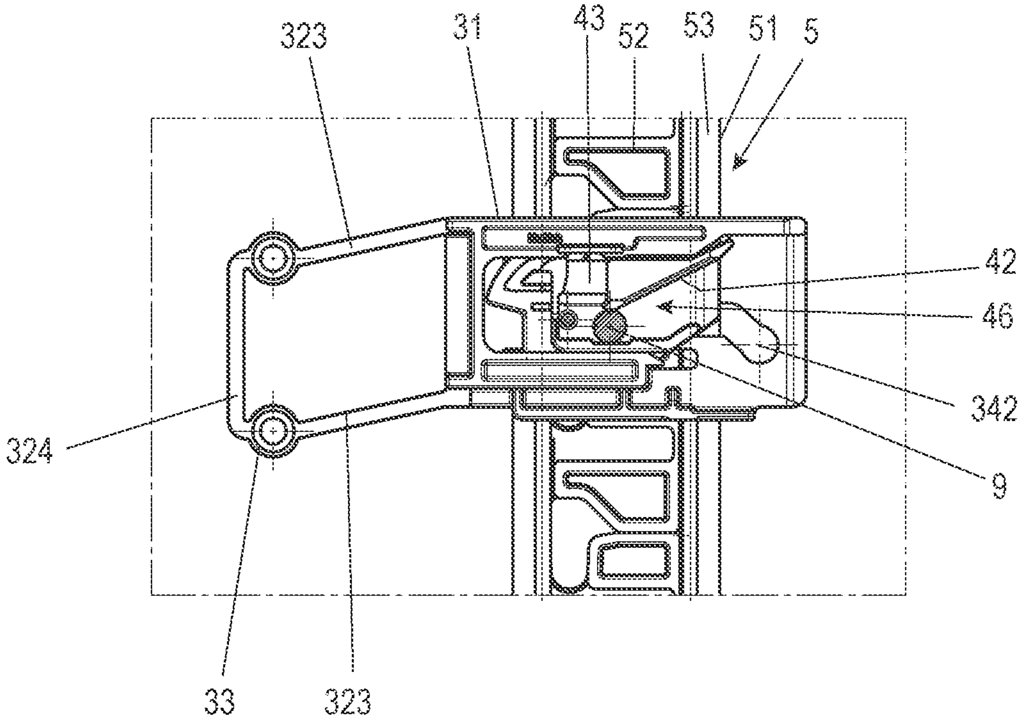
Figure 14:
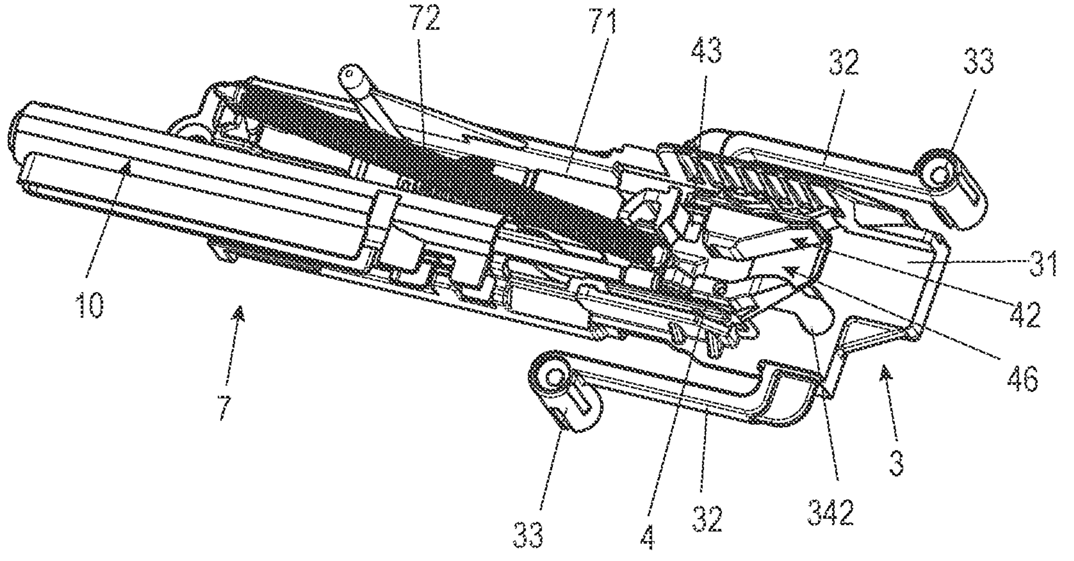
Figure 15:
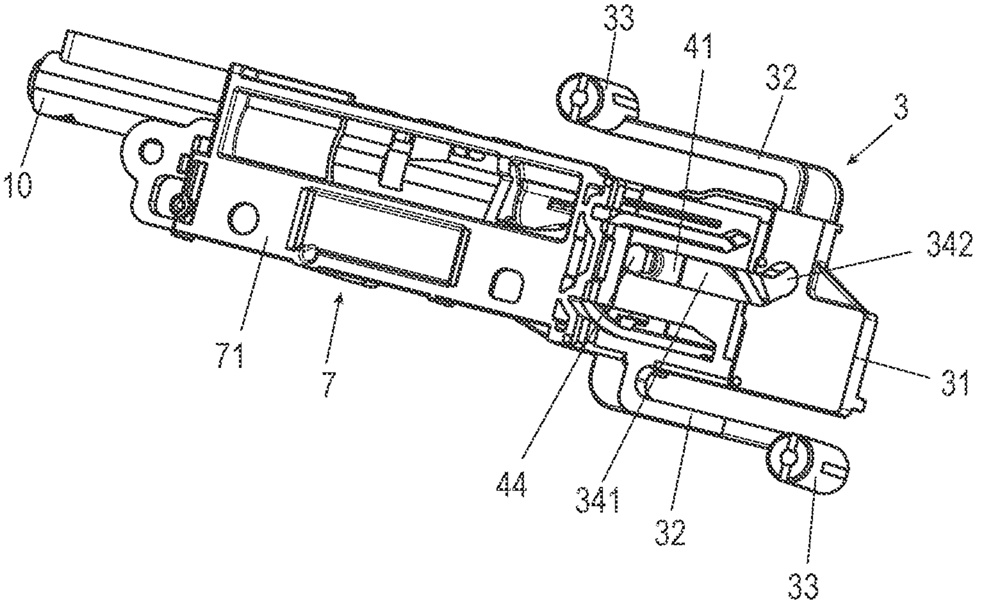

FIG. 1 shows an isometric view of a section of a piece of furniture and a furniture part that can be pulled out of it and coupling elements attached to a locking bar in the closed position of the pull-out furniture part, FIG. 2 shows an isometric view with the side panel of the furniture body omitted on a rear side of the locking bar, FIG. 3 shows a top view of a coupling element and activator held therein in front of a locking bar, FIG. 4 shows an isometric view of the coupling element with the activator shown in a pull-out or push-in position of the activator with the driver pivoted in a locking position, FIG. 5 shows an isometric representation corresponding to FIG. 1 after decoupling or before coupling of the activator of the pull-out furniture part with the coupling element, FIGS. 6*a* and 6*b* show isometric views of an embodiment of a housing of a coupling element from different perspectives, FIGS. 7*a* and 7*b* show corresponding to FIGS. 6*a* and 6*b*, isometric views with driver inserted, FIGS. 8*a* and 8*b* show corresponding to FIGS. 6*a* and 6*b*, respectively, an illustration of an alternative embodiment of a housing of a coupling element, FIGS. 9*a* and 9*b* show corresponding to FIGS. 6*a* and 6*b*, respectively, are illustrations of yet another further embodiment of a housing of a coupling element, FIGS. 10 and 11 show isometric views corresponding to FIG. 1 illustrating an assembly process of the activator of a pull-out furniture part to the coupling element, FIG. 12 shows a top view of a further design variant of a coupling element arranged in front of a locking bar with spring elements projecting from one side of the housing, FIG. 13 shows a representation corresponding to FIG. 12 with the coupling element moved upwards, FIG. 14 shows an isometric view of a coupling element integrally formed with a housing of a self-retracting device, FIG. 15 shows a rear view of the self-retracting device corresponding to FIG. 14.

In the following figure description, terms such as top, bottom, left, right, front, rear, etc. refer exclusively to the exemplary representation and position of the coupling element, locking bar, furniture part, furniture, driver and the like selected in the respective figures. These terms are not to be understood restrictively, i.e., due to different working positions or the mirror-symmetrical design or the like, these references may change.

In FIG. 1, the reference sign 3 designates a variant of a coupling element according to the invention.

The coupling element 3 is used to couple a locking bar 5 of a piece of furniture having a plurality of pull-out furniture parts 2 to an activator 9 coupled directly or indirectly to one of the pull-out furniture parts 2.

The pull-out furniture part 2 shown here as a drawer in FIG. 1 is also mounted on guides 6, here designed as pull-out guides.

Each of the guides 6 has a body rail 61, a running rail 62 and a holder 63, to which the body rail 61 is fixed, in a manner known from the prior art. Depending on the intended pull-out distance, it is also conceivable to arrange another center rail between the body rail 61 and the running rail 62, for example to ensure a full pull-out of the pull-out furniture part 2.

The activator 9 is preferably arranged on a side frame 21 of the pull-out furniture part 2 or a running rail 62 of the guide 6.

In the embodiment shown in FIG. 1, the coupling element 3 is attached to a wall 81 of a furniture body 8, resting on a locking bar 5. The locking bar 5, which extends vertically in a direction z, is also fastened to the wall 81 of the furniture body 2. In the embodiment shown here, the wall 81 is an inner wall of the furniture body 2 facing the pull-out furniture part 2, in which the plurality of pull-out furniture parts 2 are fastened.

The furniture part 2, which can be pulled out in a direction x perpendicular to the direction z, is preferably designed as a drawer; other designs are also conceivable, for example as a board-like shelf, basket or the like.

The locking bar 5 consists essentially of a strip body 51 in which a plurality of sliding parts 52 are displaceable along the strip body 51. The number of sliding parts 52 in the strip body 51 of the locking bar 5 is selected in such a way that, with the exception of two sliding parts 52, all sliding parts 52 are in contact with one another in pairs, while one pair of sliding parts 52 can be pushed apart by a pin 44 on a driver 4 of the coupling element 3, which is mounted displaceably in the housing 31 of the coupling element 3.

For this purpose, the driver 4 must be shifted and pivoted from a position shown by way of example in FIGS. 1 and 2, in which the pins 44 are positioned in a recess of the sliding parts 52, to a position shown in FIGS. 4 and 5.

During operation, this displaced and pivoted position of the driver 4 is accompanied by an activator 9 not in engagement with the driver 4, which is the case when the pull-out furniture part 2 is extended from the furniture body 8, as exemplified in FIG. 5.

Further drivers 4 of other coupling elements 3 are thereby locked by the locking bar 5, so that in this state further pull-out furniture parts 2 cannot be pulled out of the furniture body 8.

In order to simplify an initial assembly of a pull-out furniture part 2 with an activator 9 arranged thereon, the housing 31 of the coupling element 3 comprises at least one spring element 32 serving to fix the housing 31 relative to the locking bar 5 in order to allow a substantially vertical evasive movement of the coupling element 3.

In each of the embodiments shown in all figures, two spring elements 32 are arranged on the housing 31.

For initial assembly of the pull-out furniture part 2 with activator 9 arranged thereon, the driver 4 has a guide web 42 extending obliquely in an x-z plane, against which the activator 9 arranged on the pull-out furniture part 2 abuts when the pull-out furniture part 2 is retracted into the furniture body 8 before reaching the end position.

The guide web 42 is formed on a base plate 41 of the driver 4, which extends in an x-z plane during functional operation.

The guide web 42 is inclined in such a way that the activator 9, as shown in FIGS. 10 to 13, is beveled downward in the retraction direction E. The activator 9 can be inserted into the guide web 42. Together with a channel wall 47 formed here on the edge of the base plate 41 of the driver 4, the guide web 42 forms an assembly channel 46 into which the activator 9 runs during assembly of the pull-out furniture part 2.

After the activator 9 has abutted against the guide web 42, the activator 9 presses the driver 4 and with it the housing 31 of the coupling element 3 upward against the spring force of the spring elements 32 as it continues to move in the retraction direction E along the guide web 42.

Behind the guide web 42, the assembly channel 46 opens into a vertically aligned receiving groove 43, which delimits the activator 9 by two opposing vertical walls 431, 432 and which defines the mounting position of the activator 9 in the retracted state of the pull-out furniture part 2.

As soon as the activator 9 reaches the receiving groove 43, the spring elements 32 press the housing 31 and with it the driver back into the initial position exemplified in FIG. 1.

During assembly, the driver 4 is always in its retracted neutral position, in which the pin 44 is received in a recess 54 between adjacent sliding parts 52, which in principle allows another pull-out furniture part 2 to be pulled out.

Alternative embodiments of such coupling elements 3, partly without showing the drivers 4 are shown in FIGS. 6*a*, 6*b*, 7*a*, 7*b*, 8*a*, 8*b* and 9*a* and 9*b*.

In the embodiments shown there, the spring elements 32 are designed as spring arms formed on the housing 3. The spring elements 32 formed as spring arms are here of angular design, with a first leg 321 extending from the housing edge of the housing 31 and a second leg 322 extending from this at an angle, preferably perpendicularly.

By varying the thickness of the material and/or the length of these second legs 322 or even the angular adjustment of the spring elements 32, the spring strength of the spring elements 32 can be adjusted in a simple manner depending on the intended use.

Further, it can be seen in FIGS. 6 to 9 that a fastening area 33 in the form of an eye is formed in the region of the free ends of the second legs 322 for receiving a fastening element 11.

Possible fastening elements 11 are, for example, stop pins, as shown in FIGS. 6*a* to 7*b*, with respective pin 111 and respective bushing 112, which are pressed into corresponding recesses in the wall 81 of the furniture body 8 and then widened by hammering in the pin 111, thus securely fixing the housing to the wall 81 of the furniture body 8.

Other fastening options or designs of the fastening area 33 are also conceivable.

Thus, in the embodiment shown in FIGS. 8*a* and 8*b*, a bushing provided with an expansion slot 331 may be formed directly on the fastening area 33.

It is also conceivable to design the fastening areas 33 as screw holes for receiving screws.

It is also conceivable to provide adhesive surfaces in the area of the fastening areas 33, so that the housing 31 can be glued to the wall 81 of the furniture body 8 in the area of the fastening areas 33.

In the embodiments shown in FIGS. 1 to 11, the spring elements 32, which are designed as spring arms, are arranged, preferably integrally formed, in diagonally opposite regions of an upper edge and a lower edge of the housing 31 of the coupling element 3 in the assembled state.

The first legs 321 are preferably shorter than the second legs 322 and, in particular, are designed to be flexurally stable.

Accordingly, in this embodiment, the fastening areas 33 of the spring elements 32 are also positioned diagonally opposite each other relative to the outer edges of the housing 31, which allows the housing 31 of the coupling element 3 to move substantially vertically when assembled, as exemplified in FIG. 11.

In a further alternative embodiment, shown in FIGS. 12 and 13, the two spring elements 32 protrude from exactly one of the outer edges of the housing 31.

Here, the spring elements 32 protrude horizontally from the left-hand vertical side edge of the housing 31, i.e. the rear vertical side edge in retraction direction E.

Here, the spring elements 32 each have a rectilinear leg 323 formed directly perpendicularly projecting from a side edge of the housing 31. At the end of these rectilinear legs 323, a respective fastening area 33 in the form of an eye is integrally formed for receiving a fastening element 11. In the embodiment shown here, the fastening areas 33 of the spring elements 32 are coupled to one another, in particular integrally connected to one another, by a web 324.

Also in this variant, as shown in FIG. 13, the legs 323 of the spring elements 32 allow a vertical deflection movement of the housing 31 necessary for assembly.

As shown in FIGS. 6*b*, 7*b* and 8*b*, on the rear side of the housing 31 facing the locking bar 5, retaining webs 35 are formed vertically projecting from the rear surface of the housing 31 and project into longitudinal grooves provided for this purpose in the strip bodies 51 of the locking bar 5.

In particular, in the embodiment of the housing 31 of the coupling element 3 shown in FIGS. 12 and 13, the width of these webs 35, as viewed in the x-direction, is smaller than the width of the grooves 53 in the strip body 51 of the locking bar 5 to allow vertical movement of the housing 31 of the coupling element 3.

In FIGS. 14 and 15, the reference sign 7 indicates a self-retracting device with a housing 71 and a retracting element 72 attached to it, here in the form of a tension spring.

At the front end of the housing 71 in the pull-out direction, a coupling element 3 is provided for coupling the locking bar 5 to the pull-out furniture part 2.

In the embodiment shown here, the housing 31 of the coupling element 3 is formed integrally with the housing 71 of the self-retracting device 7.

A two-part design is also conceivable, in which the housing 71 of the self-retracting device 7 is coupled to the housing 31 of the coupling element 3.

As shown in FIG. 14, the driver 4 of the coupling element 3 is coupled to the retracting element 72 of the self-retracting device 7 and thereby holds the driver 4 without external force in the closed position, in which the coupled pull-out furniture part 2 is positioned in the retracted state in the furniture body 8.

By extending the furniture part 2 out of the furniture body 8, the driver 4 is displaced by the activator 9 from the neutral position shown in FIGS. 14 and 15 or FIG. 1 to the displaced and lowered position shown in FIGS. 4 and 5.

As a result, the retracting element 72 is preloaded.

When the pull-out furniture part 2 is subsequently pushed back into the furniture body 8, the activator 9 abuts against the stop 431, shown in FIGS. 4 and 7*a*, in a position just before the fully retracted position, causing the driver 4 to pivot from its position lowered into the angled region 342 of the guide track 34 back into the linear region 341 of the guide track 34 and then to be pulled into the fully retracted end position by the spring force of the retracting element 72, which is designed here as a tension spring.

In the embodiment variant of the self-retracting device 7 shown here, an ejector device is attached to this as an optional additional element 10, as is known from the prior art, for example from EP 2210525 B1 mentioned at the beginning, with which the pull-out furniture part 2 is ejected from the furniture body 8 from the retracted position, as shown in FIG. 1, with the support of the ejector device 10. However, a deceleration device, for example in the form of a linear damper, can also be used as an optional additional element 10.

REFERENCE SIGN

2 Furniture part
21 Side frame
3 Coupling element
31 Housing
32 Spring element
321 First leg
322 Second leg
323 Leg
324 Web
33 Fastening area
331 Expansion slot
34 Guide track
341 Linear region
342 Angled region
35 Retaining web
4 Driver
41 Base plate
42 Guide web
43 Receiving groove
431 Wall
432 Wall
44 Pin
46 Assembly channel
47 Channel wall
5 Locking bar
51 Strip body
52 Sliding part
53 Guide groove
6 Guide
61 Body rail
62 Running rail
63 Holder
7 Self-retracting device
71 Housing
72 Retracting element
8 Furniture body
81 Wall
9 Activator
10 Additional element
11 Fastening element
111 Pin
112 Bushing
X Direction
y Direction
z Direction
E Retraction direction

The invention claimed is:

1. A coupling element (3) configured for coupling a locking bar (5) of a piece of furniture having a plurality of pull-out furniture parts (2) to an activator (9) coupled directly or indirectly to one of the pull-out furniture parts (2), the coupling element comprising:
- a housing (31) which is configured to be placed against the locking bar (5),
- a driver (4) which is displaceably mounted in the housing (31) and is configured to be operatively connected to the locking bar (5) for locking a pull-out movement of the other furniture part (2) or the other furniture parts (2),
- wherein the housing (31) has a guide track (34) in which a pin (44) of the driver (4) is guided,
- wherein the housing (31) has at least one spring element (32) configured to fix the housing (31) relative to the locking bar (5) and enable the coupling element to move resiliently under force from the activator during coupling of the activator to the locking bar.

2. The coupling element (3) according to claim 1, wherein the at least one spring element (32) is designed as a spring arm formed on the housing (31).

3. The coupling element (3) according to claim 2, wherein the at least one spring element (32) designed as a spring arm is designed angularly, with a first leg (321) extending from the housing edge and a second leg (322) extending from the first leg angularly.

4. The coupling element (3) according to claim 3, wherein a fastening area (33) configured for receiving a fastening element (11) is formed in the region of a free end of the second leg (322).

5. The coupling element (3) according to claim 1, wherein wherein said two spring elements (32) protrude from opposite outer edges of the housing (31).

6. The coupling element (3) according to claim 5, wherein fastening areas (33) of the spring elements (32) are positioned diagonally opposite relative to the outer edges of the housing (31).

7. The coupling element (3) according to claim 1 wherein two of the spring elements (32) protrude from exactly one of the outer edges of the housing (31).

8. The coupling element (3) according to claim 7, wherein the spring elements (32) each have a straight leg (323) at whose end remote from the housing (31) a fastening area (33) is formed and configured for receiving a fastening element (11).

9. A closing system for a pull-out furniture part (2) of a piece of furniture comprising several pull-out furniture parts (2), the closing system comprising:
- a self-retracting device (7) having a housing (71) and a retracting element (72) attached thereto,
- a coupling element (3) for coupling a locking bar (5) to the pull-out furniture part (2),
- wherein the coupling element (3) is formed according to claim 1, and wherein the driver (4) of the coupling element (3) is coupled to the retracting element (72) of the self-retracting device (7).

10. The closing system according to claim 9, wherein the housing (71) of the self-retracting device (7) is coupled to the housing (31) of the coupling element (3).

11. The closing system according to claim 9, wherein the housing (71) of the self-retracting device (7) is formed integrally with the housing (31) of the coupling element (3).

12. Furniture with several pull-out furniture parts (2), the furniture comprising:

a body (8) with at least two walls (81) arranged parallel to each other, on which guides (6) are arranged for guiding said pull-out furniture parts (2) arranged one above the other, wherein a locking bar (5) for locking a pull-out movement of the furniture parts (2) is fastened to at least one of the walls (81) of the body (8), coupling elements (3) for coupling the locking bar (5) to each one of the pull-out furniture parts (2), and wherein at least one of the coupling elements (3) is formed according to claim 1.

13. Furniture according to claim 12, wherein the at least one coupling element (3) is arranged vertically displaceable in or on the locking bar (5) by the at least one spring element (32).

14. Furniture according to claim 12, wherein the housing (31) of the at least one coupling element (3) is fixed to the wall (81) of the body (8) of the furniture.

15. Furniture according claim 12, wherein a self-retracting device (7) is associated with each of the pull-out furniture parts (2), the self-retracting device (7) comprising a housing (71) and a retracting element (72) fixed thereto and coupled to the driver (4) of the coupling element (3).

* * * * *